United States Patent
Watanabe

(10) Patent No.: US 10,996,901 B2
(45) Date of Patent: May 4, 2021

(54) INFORMATION PROCESSING APPARATUS AND NON-TRANSITORY COMPUTER READABLE MEDIUM FOR CHANGEABLY DISPLAYING A SETTING VALUE OF A SPECIFIC SETTING ITEM SET TO NON-DISPLAY

(71) Applicant: FUJI XEROX CO., LTD., Tokyo (JP)

(72) Inventor: Tetsuya Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 159 days.

(21) Appl. No.: 15/995,507

(22) Filed: Jun. 1, 2018

(65) Prior Publication Data

US 2018/0364953 A1 Dec. 20, 2018

(30) Foreign Application Priority Data

Jun. 16, 2017 (JP) .............................. JP2017-118769

(51) Int. Cl.
| | |
|---|---|
| *G06F 3/12* | (2006.01) |
| *G06F 3/0482* | (2013.01) |
| *G06F 3/0484* | (2013.01) |
| *H04N 1/00* | (2006.01) |

(52) U.S. Cl.
CPC .......... *G06F 3/1204* (2013.01); *G06F 3/0482* (2013.01); *G06F 3/04847* (2013.01); *G06F 3/1258* (2013.01); *H04N 1/00506* (2013.01)

(58) Field of Classification Search
CPC .. G06F 3/1204; G06F 3/0482; G06F 3/04847; G06F 3/1258; H04N 1/00566; H04N 1/00506

USPC ........................................................ 358/1.2
See application file for complete search history.

(56) References Cited

U.S. PATENT DOCUMENTS

| | | | | |
|---|---|---|---|---|
| 2004/0257604 | A1* | 12/2004 | Morooka ............... | G06F 3/1285 358/1.14 |
| 2006/0224780 | A1* | 10/2006 | Saito ..................... | G06F 3/1205 710/8 |
| 2008/0043255 | A1* | 2/2008 | Wada .................. | H04N 1/00167 358/1.2 |
| 2011/0222078 | A1 | 9/2011 | Yoshida et al. | |
| 2011/0292428 | A1* | 12/2011 | Ishii ..................... | G06F 3/0488 358/1.13 |
| 2012/0144329 | A1* | 6/2012 | Sasaki ................. | G06F 9/44505 715/764 |
| 2014/0145987 | A1* | 5/2014 | Nishimura ......... | H04N 1/00413 345/173 |

(Continued)

FOREIGN PATENT DOCUMENTS

| | | |
|---|---|---|
| JP | 2008-158692 A | 7/2008 |
| JP | 2010-201814 A | 9/2010 |

(Continued)

OTHER PUBLICATIONS

Mar. 3, 2021 Office Action issued in Japanese Patent Application No. 2017-118769.

*Primary Examiner* — Allen H Nguyen
(74) *Attorney, Agent, or Firm* — Oliff PLC

(57) ABSTRACT

An information processing apparatus includes a display control unit that, when an operation is performed on one or more other setting items related to a specific non-display setting item, performs control to changeably display a setting value of the specific setting item.

17 Claims, 21 Drawing Sheets

(56) References Cited

U.S. PATENT DOCUMENTS

| | | | | |
|---|---|---|---|---|
| 2015/0077777 A1* | 3/2015 | Hayakawa | ......... | H04N 1/00472 |
| | | | | 358/1.13 |
| 2017/0163826 A1* | 6/2017 | Nakazawa | ......... | H04N 1/00482 |
| 2017/0272592 A1* | 9/2017 | Shibata | .............. | H04N 1/00413 |

FOREIGN PATENT DOCUMENTS

| JP | 2011-191432 A | 9/2011 |
|---|---|---|
| JP | 2016-101659 A | 6/2016 |

\* cited by examiner

INFORMATION PROCESSING APPARATUS AND NON-TRANSITORY COMPUTER READABLE MEDIUM FOR CHANGEABLY DISPLAYING A SETTING VALUE OF A SPECIFIC SETTING ITEM SET TO NON-DISPLAY

CROSS-REFERENCE TO RELATED APPLICATIONS

This application is based on and claims priority under 35 USC 119 from Japanese Patent Application No. 2017-118769 filed on Jun. 16, 2017.

BACKGROUND

Technical Field

The present invention relates to an information processing apparatus and a non-transitory computer readable medium.

SUMMARY

According to an aspect of the invention, there is provided an information processing apparatus including a display control unit that, when an operation is performed on one or more other setting items related to a specific non-display setting item, performs control to changeably display a setting value of the specific setting item.

BRIEF DESCRIPTION OF THE DRAWINGS

Exemplary embodiments of the present invention will be described in detail based on the following figures, wherein:

FIG. 13A is a screen view illustrating an example of a menu screen, and FIG. 13B is a screen view illustrating an example of a copy setting screen;

DETAILED DESCRIPTION

Figure 1:
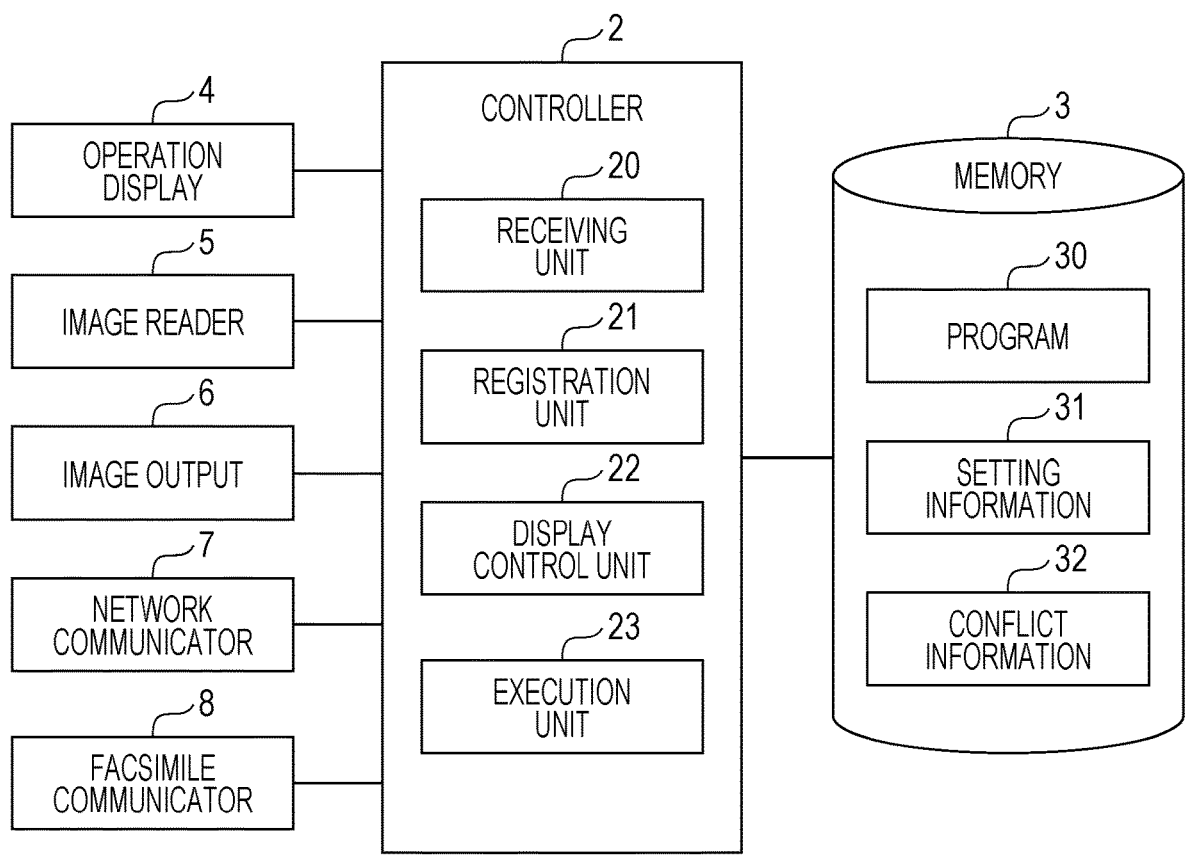
FIG. 1 is a block diagram illustrating a control system of an image forming apparatus according to a first exemplary embodiment of the invention.

Hereinafter, exemplary embodiments of the invention will be described with reference to the drawings. It is to be noted that components having substantially the same function in the drawings are labeled with the same symbol, and a redundant description is omitted. Also, an image forming apparatus will be described as an example of an information processing apparatus.

Summary of Exemplary Embodiment

The image forming apparatus according to an exemplary embodiment of the invention includes a display control unit that, when an operation is performed on one or more other setting items related to a specific non-display setting item, performs control to changeably display a setting value of the specific setting item.

The "specific setting item" refers to a setting item that is set to non-display. The "setting item" forms conditions when a function of the image forming apparatus is executed, and multiple setting items are normally provided. For instance, the setting items forming conditions when "copy", which is an example of the functions, is executed include monochrome mode/color mode, normal scan/printed paper scan, paper size, magnification, copy concentration, one side/both sides, number of images printed per page (Nin1), number of print copies, and orientation of paper. The "setting value" refers to an option or an input value that provides a specific value to the setting item.

The "related" refers to a case where initial values of both setting items are related, and a case where both setting items have related setting values. The cases of "related" include, for instance, the following cases: (a) A case where the specific setting item and other setting items have setting values in a relationship of conflict. For instance, when printed paper scan is enabled only in color mode, printed paper scan and monochrome mode are in a relationship of conflict. (b) A case where a setting value of the specific setting item is registered as a value that is operated with a high frequency in relation to an operated setting value of other setting items. For instance, double-sided print and Nin1 are operated with a high frequency by a common intention of forming many images on a sheet of paper.

The "operation is performed on other setting items" refers to a case where an operation of selecting or inputting a setting value of other setting items is performed, for instance.

The "to changeably display a setting value of the specific setting item" indicates that for instance, multiple setting values (options) may be selectably displayed, an input window, an input column, an input frame or the like for a setting value may be displayed, or an operating part such as a switch or a button, to which a setting value is assigned, may be displayed.

First Exemplary Embodiment

FIG. 1 is a block diagram illustrating a control system of an image forming apparatus according to a first exemplary embodiment of the invention. An image forming apparatus 1 is, for instance, a multifunction machine that has multiple functions such as a copy function, a scan function, a print function, and a facsimile function. The image forming apparatus 1 includes a controller 2, a memory 3, an operation display 4, an image reading section 5, an image output 6, a network communicator 7, and a facsimile communicator 8.

The controller 2 includes a central processing unit (CPU), and an interface. The CPU operates in accordance with a program 30, thereby serving as a receiving unit 20, a registration unit 21, a display control unit 22, and an execution unit 23. The details of the units 20 to 23 will be described later.

Figure 2:
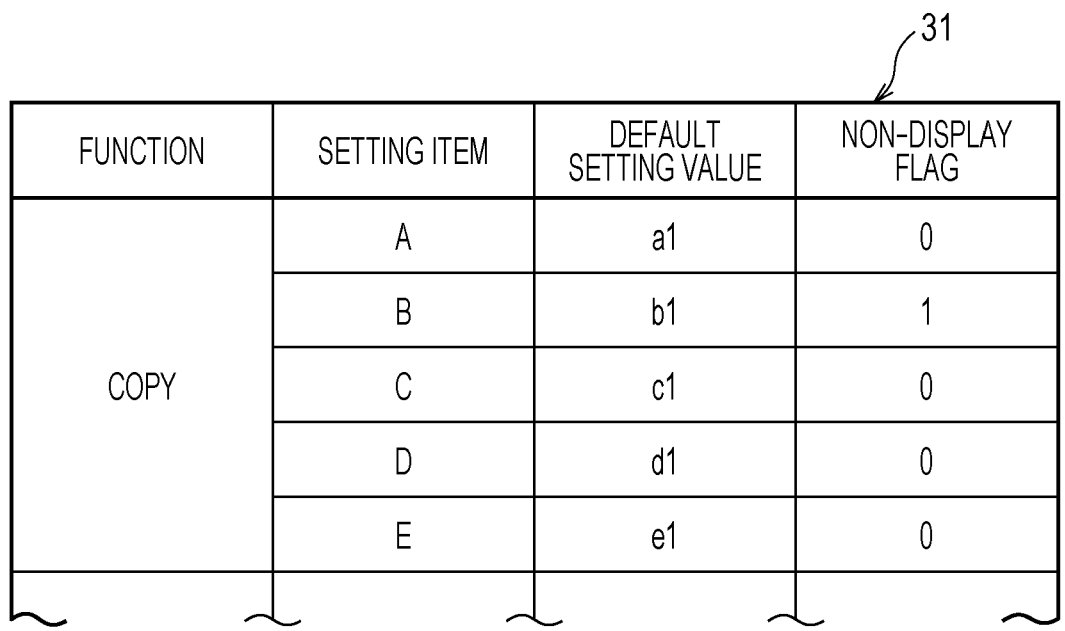
FIG. 2 is a table illustrating an example of setting information.
Figure 3:
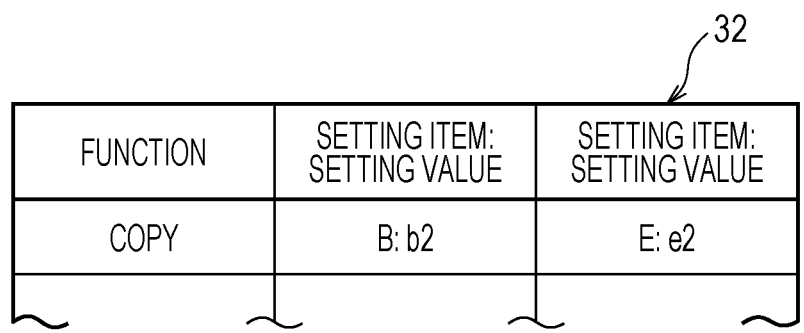
FIG. 3 is a table illustrating an example of conflict information.

The memory 3 includes a read only memory (ROM), a random access memory (RAM), and a hard disk, and stores the program 30, setting information 31 (see FIG. 2), and conflict information 32 (see FIG. 3). The setting information 31 includes information on setting items each of which is to be displayed by default but is set to non-display by customization (editing).

The operation display 4 has a structure in which a touch panel is additionally provided to a display such as a liquid crystal display for instance, and displays information on the setting screen on a display screen, and receives an operation to the touch panel from an operator.

The image reading section 5 includes, for instance, a scanner and an automatic document feeder, and reads a document placed on a platen or an image from a document fed from the automatic document feeder.

The image output 6 forms and outputs an image to a recording medium such as paper by an electrophotographic system, or an inkjet system, for instance. The image output 6 forms and outputs an image to a recording medium, the image being read by the image reading section 5, or being included in a print job which is transmitted from a user terminal apparatus via a network and received by the network communicator 7.

The network communicator 7 is implemented, for instance, by a network interface card (NIC) or the like, and communicates with the outside via a network. The network communicator 7 transmits an image read by the image reading section 5 to a user terminal apparatus via a network depending on a function selected. In addition, the network communicator 7 receives, for instance, a print job transmitted from a user terminal apparatus via a network.

The facsimile communicator 8 has the function of a modem that performs modulation and demodulation of image data in accordance with a facsimile protocol such as G3, G4, and the function of an NCU that performs connection control with a public line network, and performs FAX transmission and reception via a public line network.

FIG. 2 is a table illustrating an example of the setting information 31. The setting information 31 associates a setting item for setting a function with a default setting value in which a setting value of default is recorded, and information on whether or not the setting item is displayed or not displayed. The setting information 31 includes "function" column in which a function name such as copy is recorded, "setting item" column in which a setting item corresponding to the function is recorded, "default setting value" column in which a default setting value is recorded, and "non-display flag" column in which "0" for display or "1" for non-display is recorded as information indicating whether or not the setting item is to be displayed on a display screen of the operation display 4. Hereinafter, a setting item, which is set to non-display with "1" recorded in the "non-display flag" column, is referred to as a "specific setting item". Setting a setting item to non-display causes the setting item not to be displayed on the initial screen of the setting screen of a corresponding function, and thus the number of setting items displayed on the display screen of the operation display 4 can be reduced. In other words, when the number of setting items to be displayed is reduced, the display screen can be downsized.

FIG. 3 is a table illustrating an example of conflict information 32. The conflict information 32 records setting items and setting values of the setting items in a conflict relationship for each of functions. The conflict information 32 includes "function" column in which a function name such as copy is recorded, "setting item: setting value" column in which one set of a setting item and a setting value involved in a conflict relationship are recorded, and "setting item: setting value" column in which the other set of a setting item and a setting value involved in the conflict relationship are recorded.

The receiving unit 20 receives information such as a setting item selected from the display screen of the operation display 4, and a selected or inputted setting value.

Figure 19:
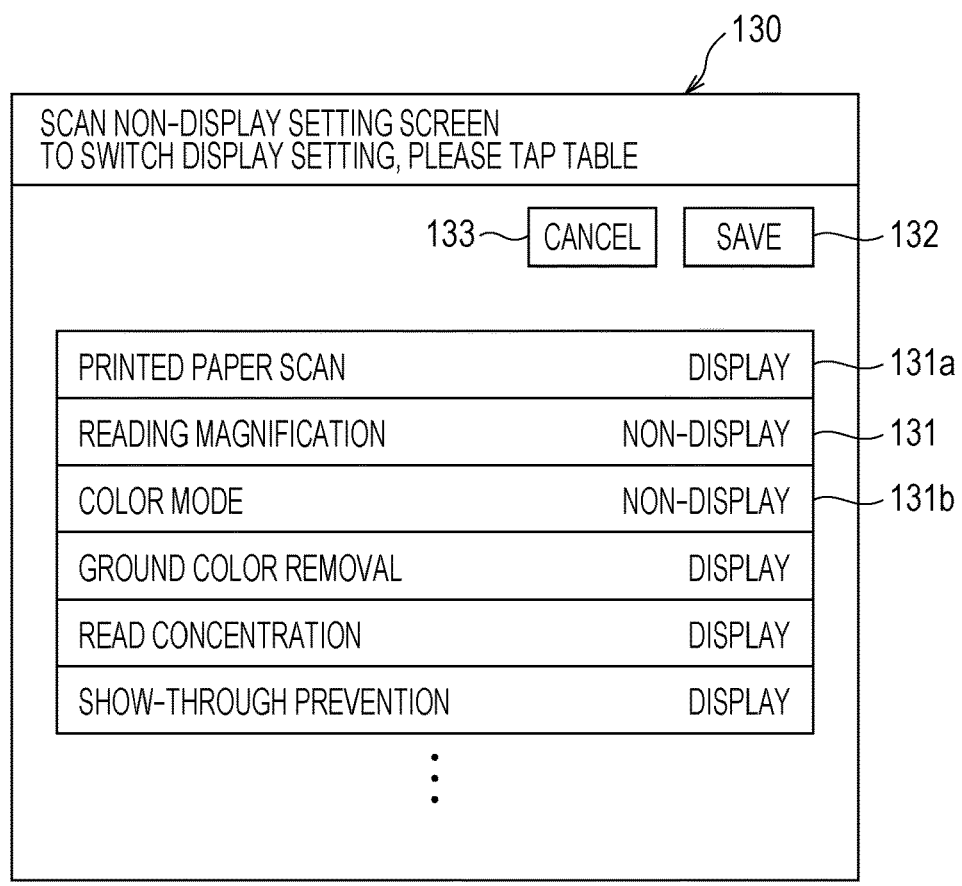
FIG. 19 is a screen view illustrating an example of a non-display setting screen according to the third exemplary embodiment.

The registration unit 21 registers information on a setting item in the memory 3 as the setting information 31, the setting item which is to be displayed by default but is set to non-display through customization (editing) by an operation on the non-display setting screen (see FIG. 19). Here, the setting item which is to be displayed by default refers to a setting item that is in a display state even if a setting operation by a user is not received, and refers to, for instance, a setting item at the time of factory shipment or a setting item displayed after equipment is reset. In other words, the setting item which is to be displayed by default refers to a setting item before customization is made.

When other setting items related to a specific non-display setting item are operated, the display control unit 22 performs control to changeably display a setting value of the specific setting item on the display screen of the operation display 4. The timing of display control refers to a time when other setting items are operated, and may include the timing of selection of one of other setting items by a user simply touching, and when other setting items need input of a setting value, the timing of start of input of the setting item, and the timing of completion of input of the setting item. Specifically, the display control unit 22 performs control to display the specific setting item in a different manner from a manner for other setting items. Specifically, the display control unit 22 displays the specific setting item in a different manner in a second section different from a first section in which other setting items are displayed, and performs control to display at least part of the first section and the second section at the same time. The display control unit 22 may display the specific setting item in the second section which is arranged to overlap with the first section, may ensure the second section in which the specific setting item is displayed and may display the specific setting item in the second section by deforming or moving the first section in which the other setting items are displayed, or may insert and display the specific setting item in a position adjacent to other setting items by changing the screen structure in which other setting items are displayed. In addition, the display control unit 22 may perform control to changeably display the setting value of the specific setting item, for instance, by moving the display section on the screen like scrolling.

After the setting value of the specific setting item, in which the setting value is changeably displayed, is changed, the display control unit 22 preferably restores the screen structure to a state before the specific setting item is displayed. As an example of a method of restoring a previous state before the display, after the setting value of the specific setting item, in which the setting value is changeably displayed, is changed, the display control unit 22 may set the specific setting item to non-display.

The execution unit 23 executes a function selected by a user in accordance with a setting item set and a setting value by controlling the image reading section 5 and the image output 6.

(Operation of Image Forming Apparatus)

Figure 4A:
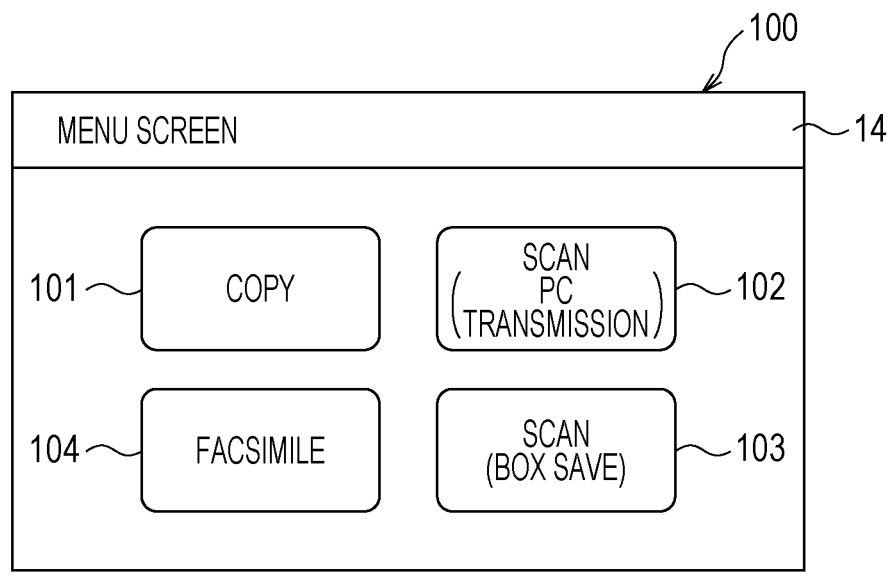
FIG. 4A is a screen view illustrating an example of a menu screen.
Figure 4B:
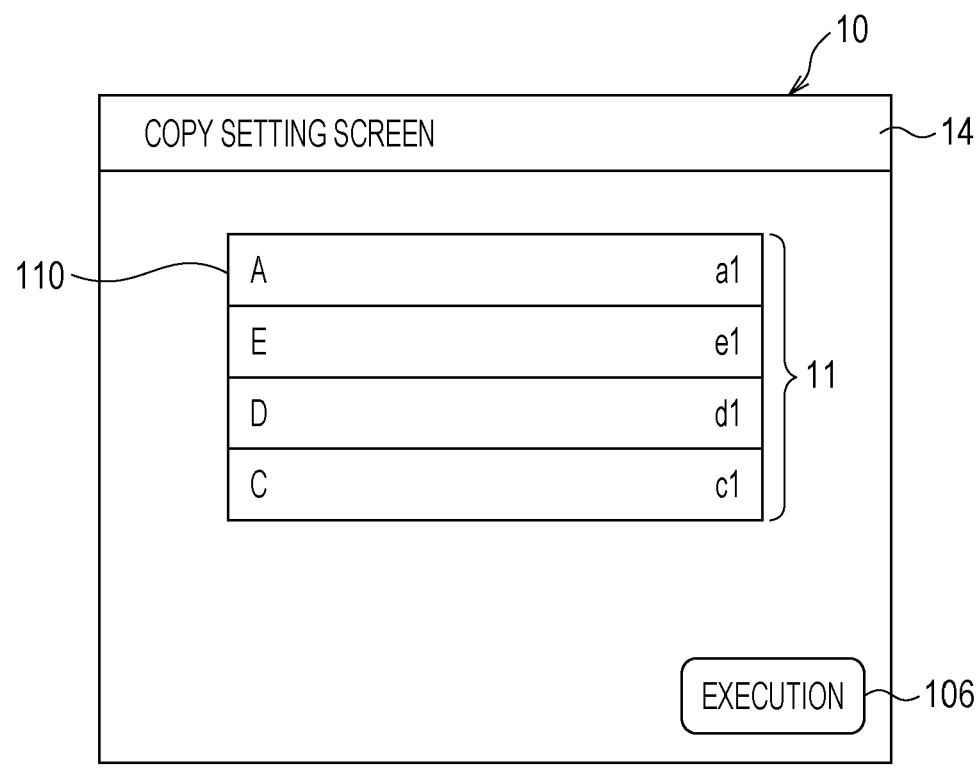
FIG. 4B is a screen view illustrating an example of a copy setting screen.

Next, an example of the operation of the image forming apparatus 1 will be described with reference to FIGS. 4A to 12B. FIG. 4A is a screen view illustrating an example of a menu screen, and FIG. 4B is a screen view illustrating an example of a copy setting screen. FIGS. 5A to 12B are each a screen view illustrating principal sections of the copy setting screen illustrated in FIG. 4B. It is to be noted that the following operations are to be performed by the display control unit 22 unless otherwise stated.

(1) Selection of Function

When a user activates the image forming apparatus 1, as illustrated in FIG. 4A, a menu screen 100 is displayed as an initial screen on the display screen of the operation display 4. The menu screen 100 includes a screen name display section 14 in which a menu screen is displayed as a screen name, and multiple buttons for executing multiple functions, for instance, "copy" button 101 for executing copy, "scan (PC transmission)" button 102 for transmitting an image obtained by scan to a user terminal apparatus, "scan (box save)" button 103 for saving an image obtained by scan in a box inside the apparatus 1, and "facsimile" button 104 for executing facsimile. Here, it is assumed that a user selects copy from the menu screen 100 by touching "copy" button 101. Then, a copy setting screen is displayed on the display screen of the operation display 4.

(2) Display of Copy Setting Screen

FIG. 4B is a screen view illustrating an example of an initial screen of the copy setting screen displayed on the display screen of the operation display 4. The initial screen of the copy setting screen 10 illustrated in FIG. 4B includes a screen name display section 14 in which the copy setting screen as a screen name is displayed, and an item display section 11 in which multiple rows 110 are continuously arranged in a lengthwise direction. In the rows 110, multiple setting items A, E, D, and C, and setting values a1, e1, d1, and c1 for the setting items A, E, D, and C are displayed.

The copy setting screen 10 illustrated in FIG. 4B includes "execution" button 106. When a user operates the "execution" button 106, setting values of the setting items related to copy are determined. The execution unit 23 executes copy by controlling the image reading section 5 and the image output 6 in accordance with the determined setting values of the setting items. The image reading section 5 reads a document placed on a platen or an image from a document fed from an automatic document feeder. The image output 6 forms and outputs an image read by the image reading section 5 to a recording medium based on the determined setting values of the setting items.

It is assumed that setting items A, B, C, D, and E are provided as setting items for setting the details of copy. Also, it is assumed that the setting item B is a specific setting item (hereinafter referred to as "non-display setting item") which is set to non-display on the initial screen of the copy setting screen 10. Also, it is assumed that the setting value of the setting item E is set to setting value e1 as a default, and the setting value of the setting item B is set to setting value b2 as a default. Also, it is assumed that the setting value e2 of the setting item E and the setting value b2 of the setting item B are in a relationship of conflict. Here, the setting item B is an example of the specific setting item. The setting item E is an example of other setting items having a setting value in conflict with the specific setting item. The item display section 11 is an example of the first section in which other setting items are displayed.

In this case, when the setting value e1 of the setting item E is changed to the setting value e2 with the setting value b2 of the non-display setting item B unchanged, the setting value e2 of the setting item E and the setting value b2 of the setting item B conflict with each other. Thus, in this exemplary embodiment, when a user touches the setting item E to change the setting value e1 of the setting item E, the setting item B is displayed, and a prompt for changing the setting value b2 of the setting item B is displayed.

The setting item B is not displayed on the initial screen of the copy setting screen 10 illustrated in FIG. 4B because the setting item B is set to non-display as described above.

(3) Operation of Other Setting Items

Figure 5A:
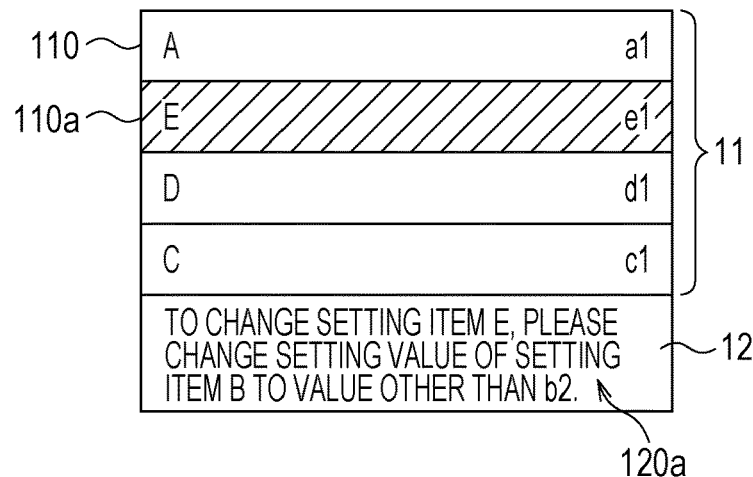
FIGS. 5A to 5C are each a screen view illustrating an example of a copy setting screen.

As illustrated in FIG. 5A, when a user touches and selects a row 110a of the setting item E to change the setting value e1 of the setting item E, the row 110a is grayout-displayed, that is, displayed in light gray. The grayout of the row 110a allows a user to recognize that the setting item E is prohibited from being operated. It is to be noted that when the setting value e2 is an initial value and the copy setting screen 10 illustrated in FIG. 4B is selected, the row 110a may be grayout-displayed. The same goes with the case of a toggle switch 111a for the setting item E of the copy setting screen 10 illustrated in FIG. 13B described later. The grayout of the toggle switch 111a allows a user to recognize before touching that the setting item E is prohibited from being operated.

After the selected row 110a is grayout-displayed, or at the same time when the selected row 110a is grayout-displayed, a message display section 12 is displayed below the item display section 11. In the message display section 12, for instance, a message 120a saying "TO CHANGE SETTING ITEM E, PLEASE CHANGE THE SETTING VALUE OF THE SETTING ITEM B TO A VALUE OTHER THAN b2" is displayed.

(4) Display of Specific Setting Item

Figure 5B:
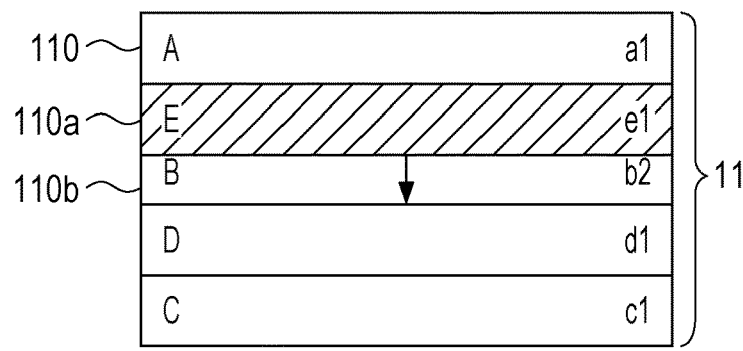
Figure 5C:
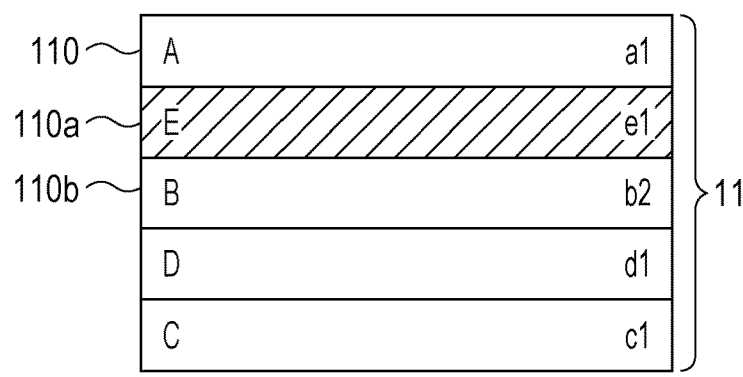

Next, as illustrated in FIG. 5B, the row 110b of the non-display setting item B gradually appears from the selected row 110a of the setting item E, and as illustrated in FIG. 5C, the entire row 110b of the setting item B appears after being inserted at a position adjacent to the row 110a of the setting item E. At this point, the setting value of the setting item B is still b2.

(5) Change of Setting Value

Figure 5D:
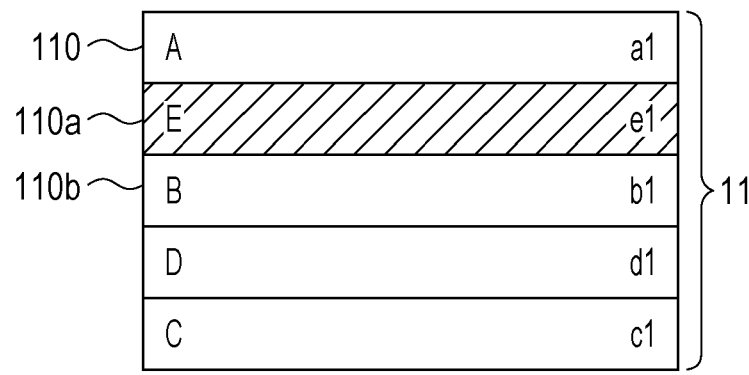
FIGS. 5D to 5F are each a screen view illustrating an example of a copy setting screen.
Figure 5E:
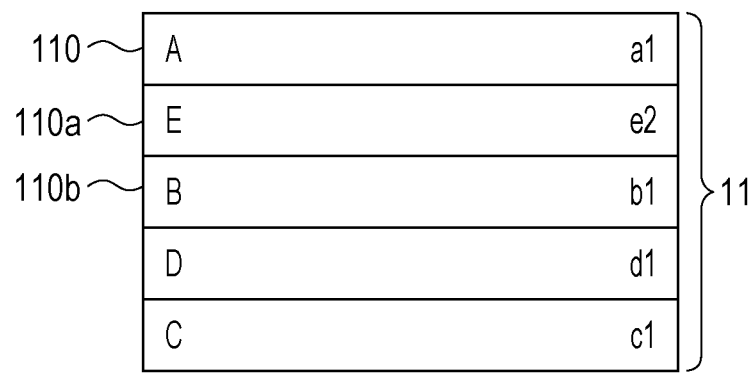

Next, a user changes the setting value b2 of the setting item B to another setting value, for example, b1 as illustrated in FIG. 5D. Since the conflict between the setting item E and the design item B is eliminated, grayout of the row 110a of the setting item E is canceled. Next, as illustrated in FIG. 5E, the setting value of the setting item E is changed from e1 to e2.

Figure 5F:
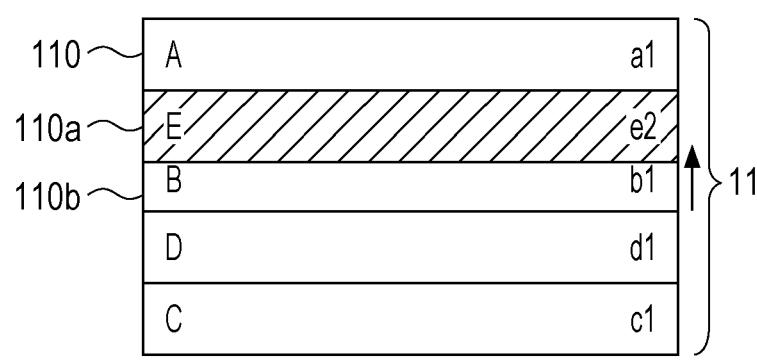

When the setting value e1 of the setting item E is changed to e2, as illustrated in FIG. 5F, the row 110b of the setting item B is gradually hidden in the back of the row 110a of the setting item E in the opposite direction to the direction in which the row 110b has appeared, and is set to non-display. An operation for displaying the specific setting item when the setting value is changed, and an operation for setting the specific setting item to the original non-display after the setting value is changed are unnecessary.

(Modification 1)

Figure 6A:
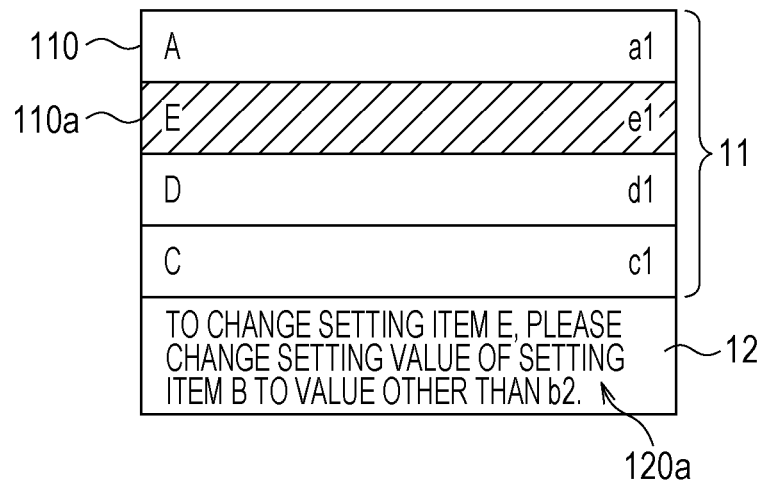
FIGS. 6A and 6B are each a screen view illustrating an example of a copy setting screen of Modification 1 according to the first exemplary embodiment.
Figure 6B:
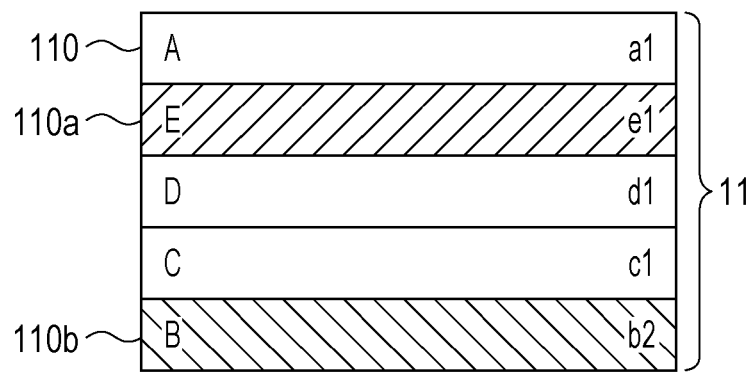

FIGS. 6A and 6B are each a screen view illustrating Modification 1. As illustrated in FIG. 6A which shows the same screen as FIG. 5A, when a user touches and selects the row 110a of the setting item E to change the setting value e1 of the setting item E, the message display section 12 appears below the item display section 11. Subsequently, as illustrated in FIG. 6B, the message display section 12 disappears, and the row 110b of the setting item B, which has not been displayed, is displayed in the last row of the item display section 11.

(Modification 2)

Figure 7A:
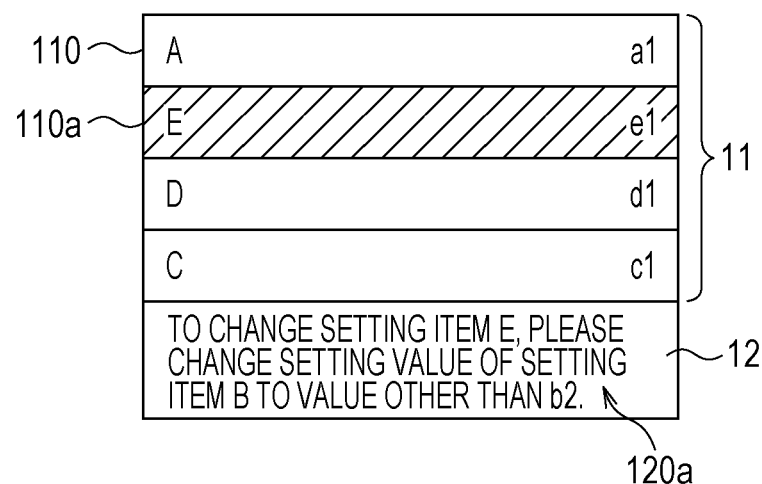
FIGS. 7A and 7B are each a screen view illustrating an example of a copy setting screen of Modification 2 according to the first exemplary embodiment.
Figure 7B:
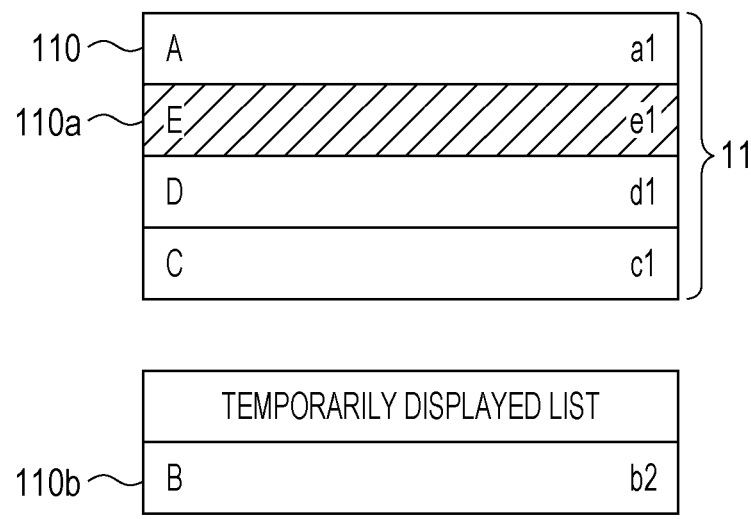

FIGS. 7A and 7B are each a screen view illustrating Modification 2. As illustrated in FIG. 7A which shows the same screen as FIG. 5A, when a user touches and selects the row 110a of the setting item E to change the setting value e1 of the setting item E, the message display section 12 appears below the item display section 11. Subsequently, as illustrated in FIG. 7B, the message display section 12 disappears, and the row 110b of the setting item B, which has not been displayed, may be displayed at a position away downward from the item display section 11. The item display section 11 is an example of the first section. The section in which the row 110b of the setting item B is displayed is an example of the second section different from the first section. The row 110b of the setting item B illustrated in FIG. 7B is attached with the comment, "temporarily displayed list", and is displayed in a different manner for other setting items displayed on the item display section 11.

(Modification 3)

Figure 8A:
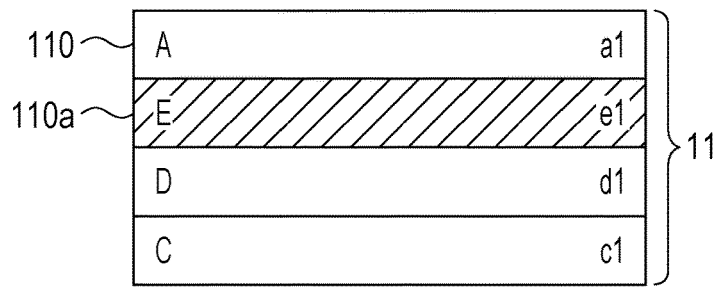
FIGS. 8A to 8D are each a screen view illustrating an example of a copy setting screen of Modification 3 according to the first exemplary embodiment.
Figure 8B:
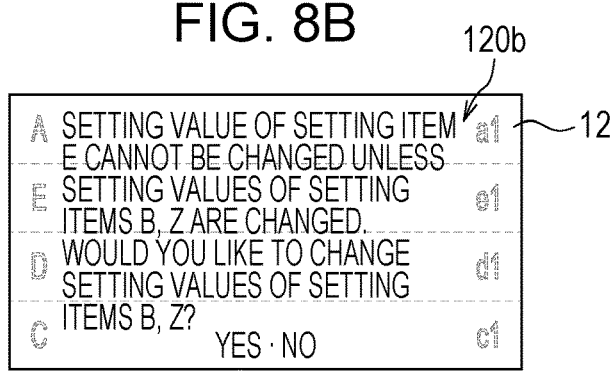
Figure 8C:
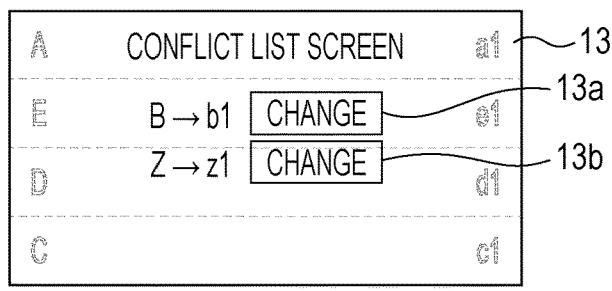

FIGS. 8A to 8D are each a screen view illustrating Modification 3. As illustrated in FIG. 8A, when a user touches and selects the row 110a of the setting item E to change the setting value e1 of the setting item E, as illustrated in FIG. 8B, the message display section 12 is displayed as an upper layer screen over the front face of the item display section 11. In the message display section 12 illustrated in FIG. 8B, for instance, message 120b saying "THE SETTING VALUE OF SETTING ITEM E CANNOT BE CHANGED UNLESS THE SETTING VALUES OF THE SETTING ITEMS B, Z ARE CHANGED. WOULD YOU LIKE TO CHANGE THE SETTING VALUES OF THE SETTING ITEMS B, Z? YES/NO" is displayed. When a user selects "YES", as illustrated in FIG. 8C, instead of the message display section 12, a conflict list screen 13 is displayed as an upper layer over the front face of the item display section 11. Here, the setting items B, Z in conflict with the setting item E are displayed. The upper layer is an example of the second section.

A user operates "change" button 13a of the setting item B to change the setting value of the setting item B to b1, and operates "change" button 13b of the setting item Z to change the setting value of the setting item B to z1. After this, as described above, the setting value e1 of the setting item E is changeable.

Figure 8D:
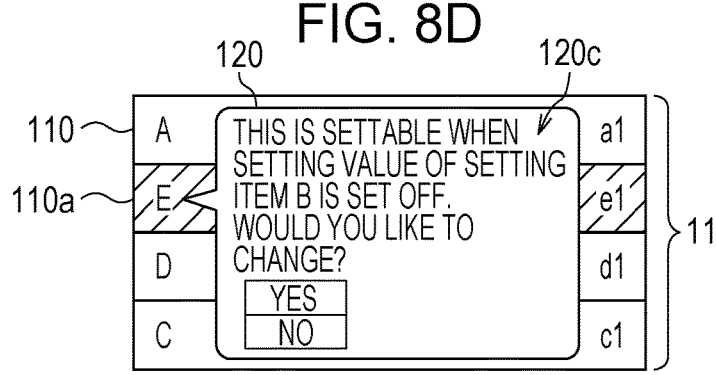

It is to be noted that after the screen illustrated in FIG. 8A is displayed, as illustrated in FIG. 8D, the message display section 12 may be displayed so as to overlap with part of the item display section 11. In the message display section 12 illustrated in FIG. 8D, for instance, a message 120c saying "THIS IS SETTABLE WHEN THE SETTING VALUE OF THE SETTING ITEM B IS SET OFF. WOULD YOU LIKE TO CHANGE? YES/NO" is displayed. When there are only two setting values of the setting item, "the setting value is set OFF" indicates that one of the setting values is set to ON, and the other of the setting values is set to OFF. When "YES" is selected, the setting item B is displayed, and change of the setting value (from ON to OFF) of the setting item B is made possible.

(Modification 4)

Figure 9A:
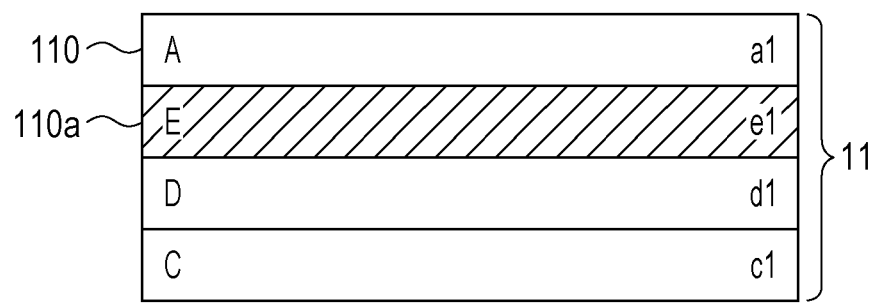
FIGS. 9A and 9B are each a screen view illustrating an example of a copy setting screen of Modification 4 according to the first exemplary embodiment.
Figure 9B:
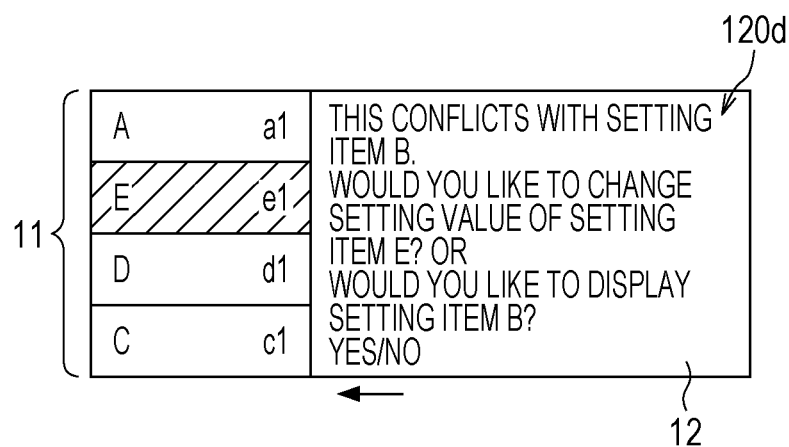

FIGS. 9A and 9B are each a screen view illustrating Modification 4. As illustrated in FIG. 9A, when a user touches and selects the row 110a of the setting item E to change the setting value e1 of the setting item E, as illustrated in FIG. 9B, the shape of the item display section 11 is changed and its area is reduced, and the message display section 12 is displayed on the right side region. In the message display section 12, for instance, a message 120d saying "THIS CONFLICTS WITH THE SETTING ITEM B. WOULD YOU LIKE TO CHANGE THE SETTING VALUE OF SETTING ITEM E? OR WOULD YOU LIKE TO DISPLAY THE SETTING ITEM B? YES/NO" is displayed. When "YES" is selected, a screen for changing the setting value of the setting item B may be displayed on the right side region of the item display section 11.

(Modification 5)

Figure 10A:
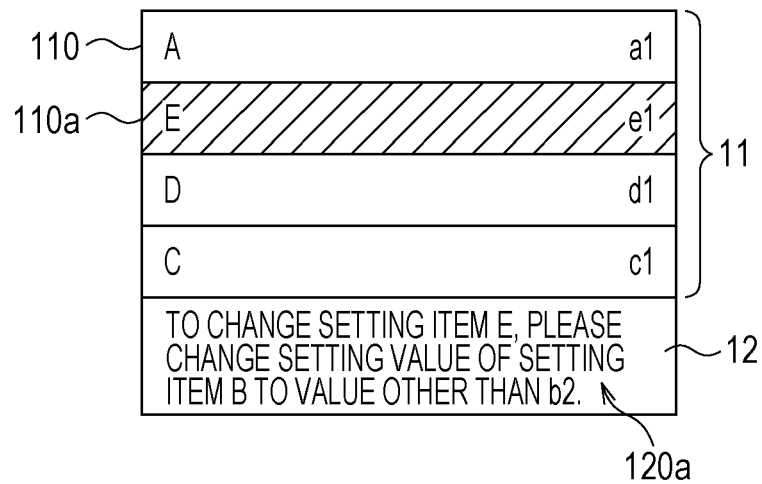
FIGS. 10A to 10C are each a screen view illustrating an example of a copy setting screen of Modification 5 according to the first exemplary embodiment.
Figure 10B:
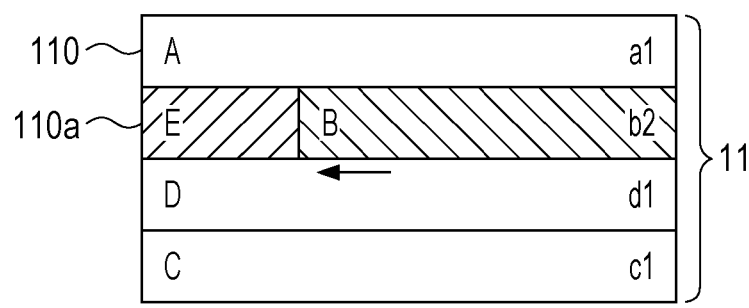
Figure 10C:
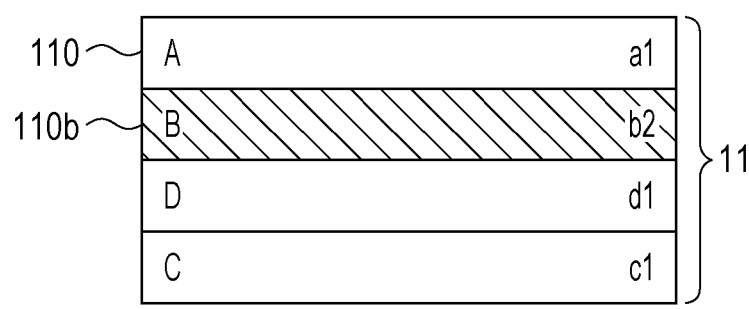

FIGS. 10A to 10C are each a screen view illustrating Modification 5. As illustrated in FIG. 10A which shows the same screen as FIG. 5A, when a user touches and selects the row 110a of the setting item E to change the setting value e1 of the setting item E, the message display section 12 appears below the item display section 11. Subsequently, as illustrated in FIG. 10B, the setting value b2 of the setting item B gradually appears on the right side of the row 110a of the setting item E. Finally, as illustrated in FIG. 10C, the row 110a of the setting item E is replaced by the row 110b of the setting item B. Subsequently, when the setting value b2 of the setting item B is changed to b1, the row 110b of the setting item B is replaced by the row 110a of the setting item E, and the setting value e1 of the setting item E may be changed to e2.

(Modification 6)

Figure 11A:
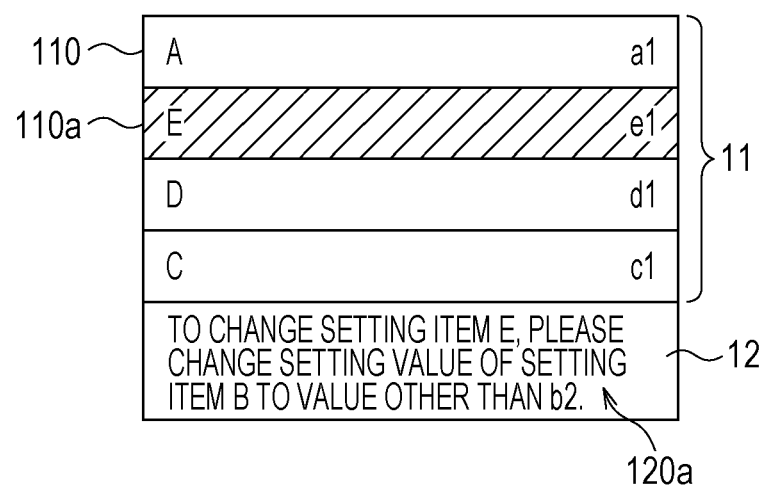
FIGS. 11A and 11B are each a screen view illustrating an example of a copy setting screen of Modification 6 according to the first exemplary embodiment.
Figure 11B:
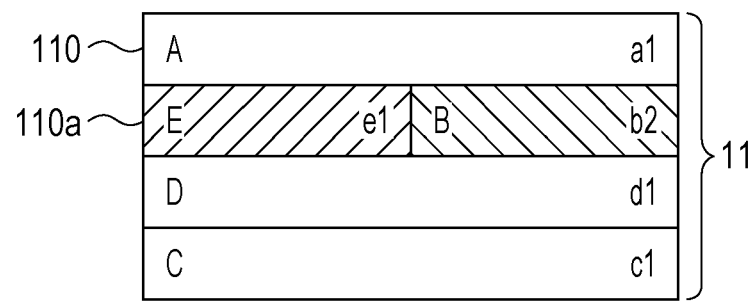

FIGS. 11A and 11B are each a screen view illustrating Modification 6. As illustrated in FIG. 11A which shows the same screen as FIG. 5A, when a user touches and selects the row 110a of the setting item E to change the setting value e1 of the setting item E, the message display section 12 appears below the item display section 11. Subsequently, as illustrated in FIG. 11B, the setting value b2 of the setting item B is displayed on the right half of the row 110a of the setting item E. Since the setting item E and the setting item B are displayed on the same row, a mistake in changing a setting value is unlikely to occur.

(Modification 7)

Figure 12A:
FIGS. 12A and 12B are each a screen view illustrating an example of a copy setting screen of Modification 7 according to the first exemplary embodiment.
Figure 12B:
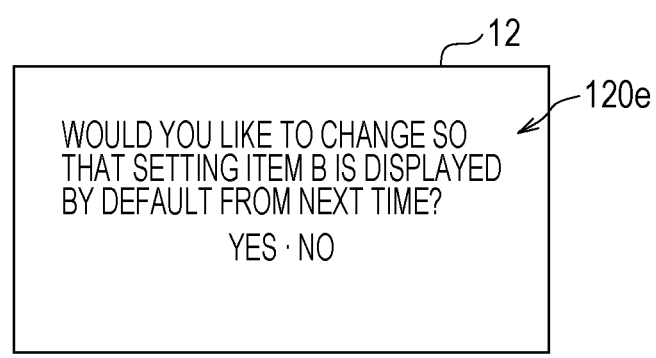

FIGS. 12A and 12B are each a screen view illustrating Modification 7. As illustrated in FIG. 12A which shows the same screen as FIG. 5A, after the setting value b2 of the setting item B is changed to b1 and the setting value e1 of the setting item E is changed to e2, as illustrated in FIG. 12B, the message display section 12 may be displayed as an upper layer over the front face of the item display section 11, and for instance, a message 120e saying "WOULD YOU LIKE TO CHANGE SO THAT THE SETTING ITEM B IS DISPLAYED BY DEFAULT FROM THE NEXT TIME? YES/NO" may be displayed. When "YES" is selected, the setting item B is no longer a non-display setting item, and the setting item B is displayed on the initial screen of the copy setting screen.

Second Exemplary Embodiment

Figure 13A:
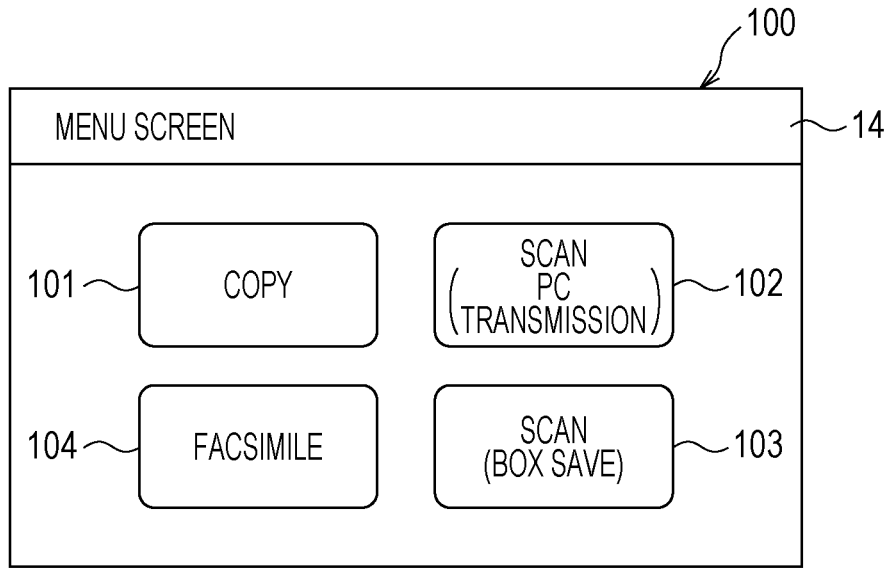
FIGS. 13A and 13B are each a screen view according to a second exemplary embodiment of the invention.
Figure 13B:
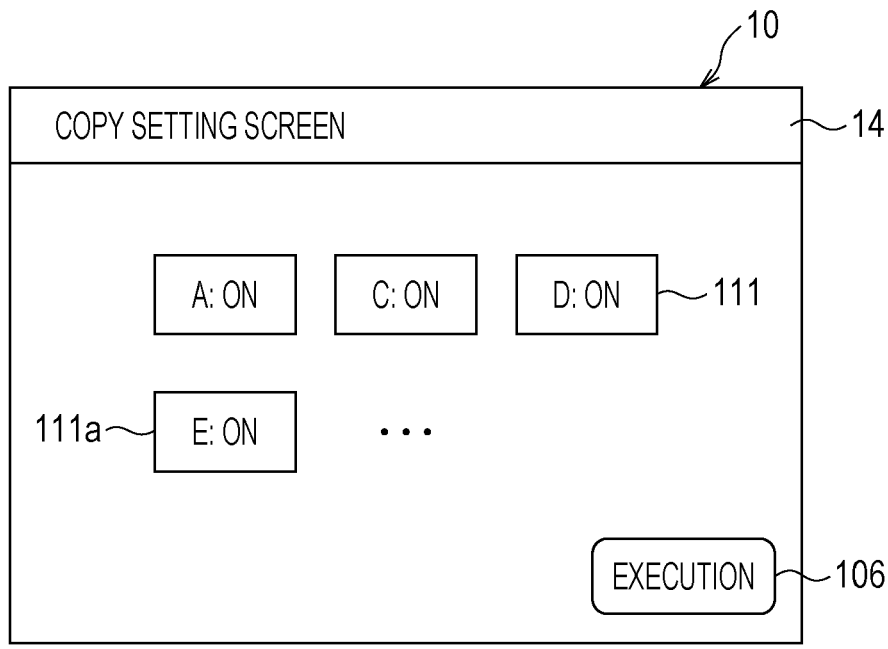

FIGS. 13A and 13B are each a screen view illustrating an example of a menu screen according to a second exemplary embodiment of the invention. It is to be noted that FIG. 13A is the same screen as FIG. 4A that shows the first exemplary embodiment.

When "copy" button 101 is touched and selected from the menu screen 100, the initial screen of the copy setting screen 10 is displayed as illustrated in FIG. 13B.

In the copy setting screen 10 illustrated in FIG. 13B, multiple toggle switches 111 for changing the setting values of the setting items A, C, D, and E are displayed. Each of the setting items A, C, D, and E has two setting values. One of the setting values is selected for ON, and the other of the setting values is selected for OFF.

In the initial screen of the copy setting screen 10 illustrated in FIG. 13B, the toggle switch 111 of the setting item B is not displayed because the setting item B is set to non-display.

Figure 14A:
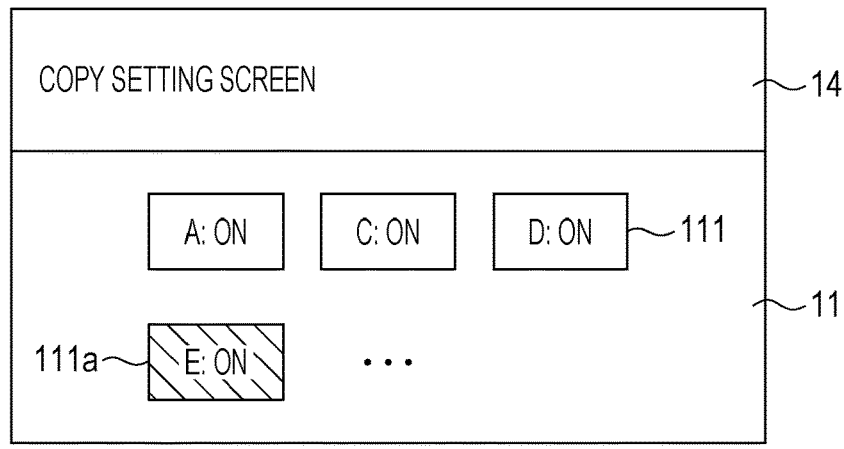
FIGS. 14A to 14C are each a screen view illustrating an example of a copy setting screen according to the second exemplary embodiment.
Figure 14B:
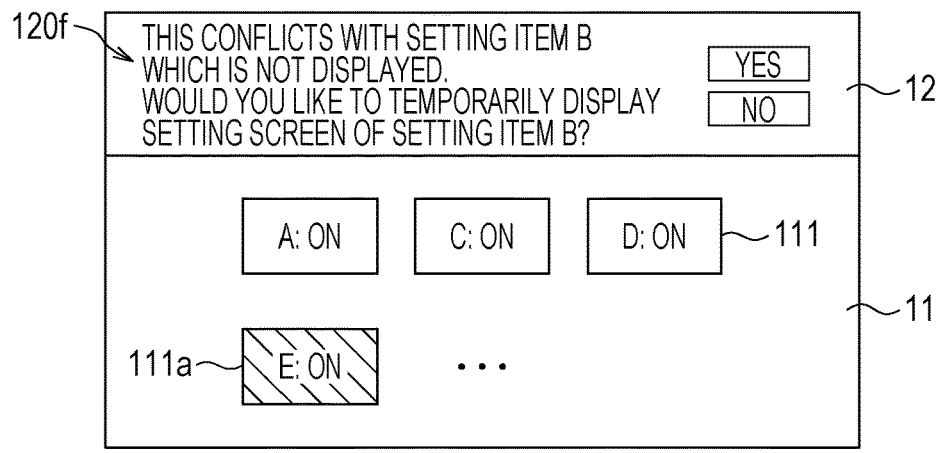

As illustrated in FIG. 14A, when a user touches and selects the toggle switch 111a of the setting item E to change the setting value e1 of the setting item E, the toggle switch 111a is grayout-displayed, that is, displayed in light gray. The grayout of the toggle switch 111a allows a user to recognize that the setting item E is prohibited from being operated.

Figure 14C:
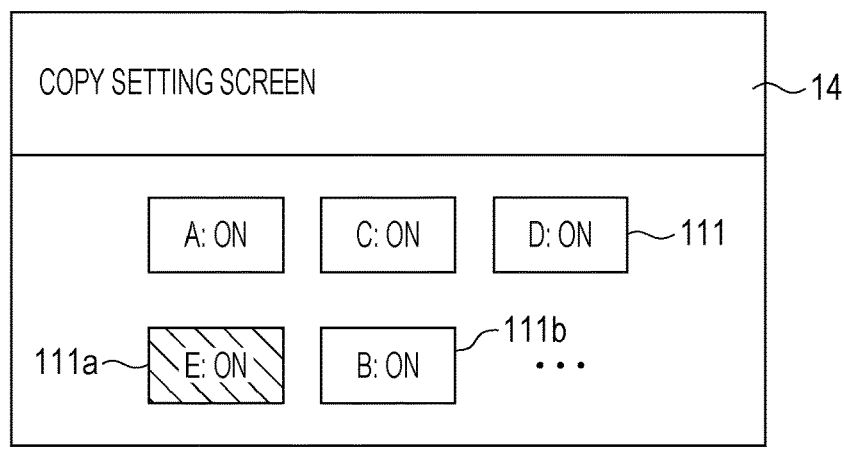

After the toggle switch 111a is grayout-displayed, or at the same time when the toggle switch 111a is grayout-displayed, the screen name display section 14 is replaced by the message display section 12. In the message display section 12, for instance, a message 120f saying "THIS CONFLICTS WITH THE SETTING ITEM B WHICH IS NOT DISPLAYED. WOULD YOU LIKE TO TEMPORARILY DISPLAY THE SETTING SCREEN OF THE SETTING ITEM B? YES/NO" is displayed. When "YES" is selected, as illustrated in FIG. 14C, a toggle switch 111b of the setting item B is displayed next to the toggle switch 111a of the setting item E.

(Modification 1)

Figure 15A:
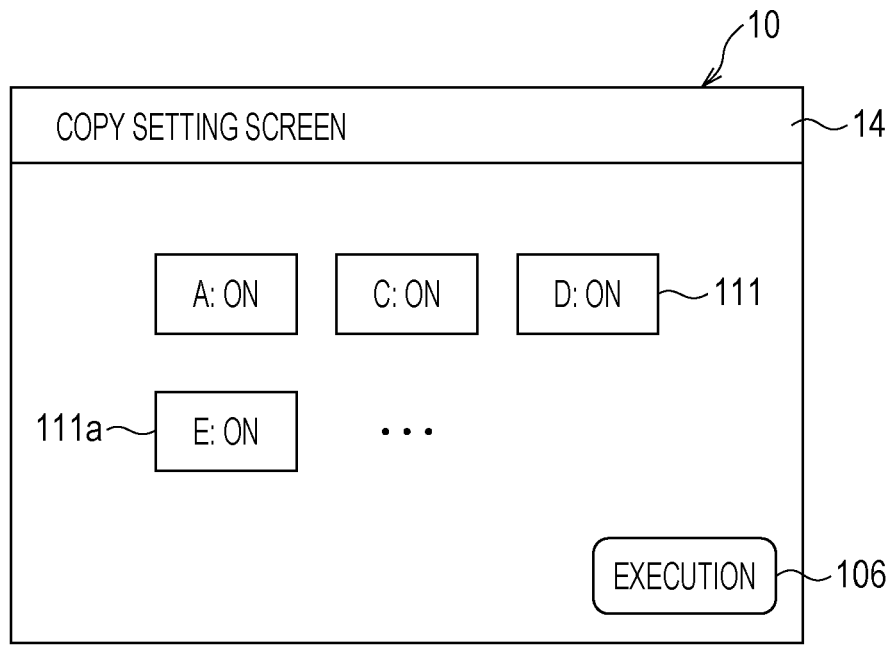
FIGS. 15A and 15B are each a screen view illustrating an example of a copy setting screen of Modification 1 according to the second exemplary embodiment.
Figure 15B:
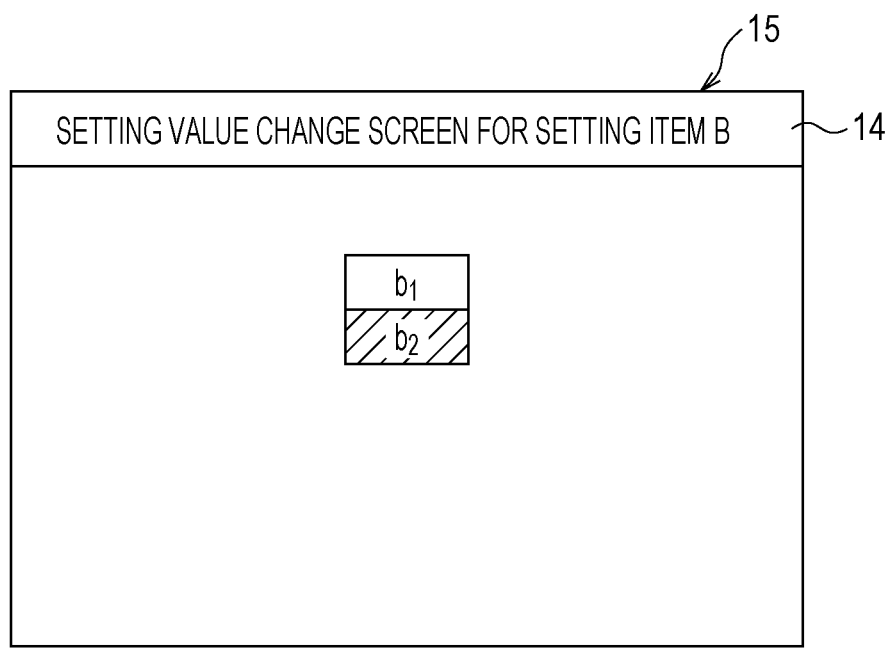

FIGS. 15A and 15B are each screen view illustrating Modification 1 of the second exemplary embodiment. When the toggle switch 111a of the setting item E is selected in the copy setting screen 10 illustrated in FIG. 15A which shows the same screen as FIG. 13B, as illustrated in FIG. 15B, a setting value change screen 15 of the setting item B may be displayed. In the setting value change screen 15, setting values b1, b2 of the setting item B are displayed. The setting value b2 conflicts with the setting value e2 of the setting item E, thus is grayout-displayed. A user selects the setting value b1 of the setting item B, which is not grayout-displayed. Subsequently, the setting value change screen 15 of the setting item B disappears, and the toggle switch 111a of the setting item E may be set to OFF on the screen illustrated in FIG. 15A.

(Modification 2)

Figure 16A:
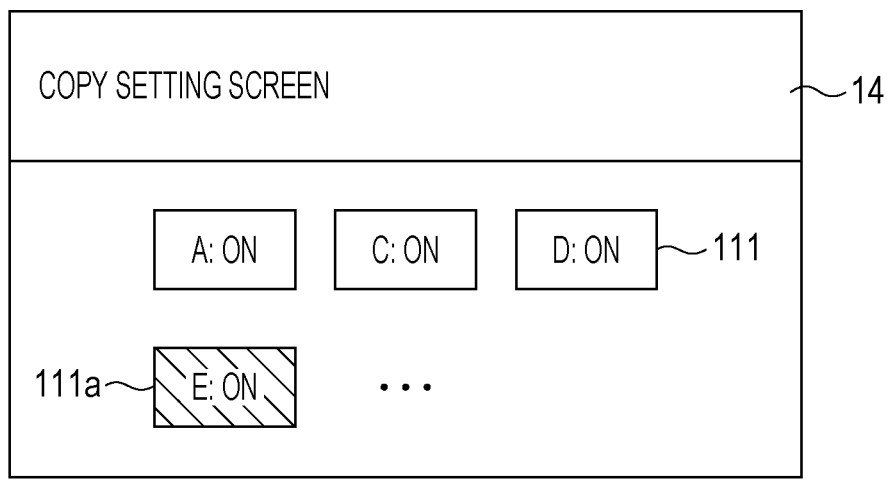
FIGS. 16A and 16B are each a screen view illustrating an example of a copy setting screen of Modification 2 according to the second exemplary embodiment.
Figure 16B:
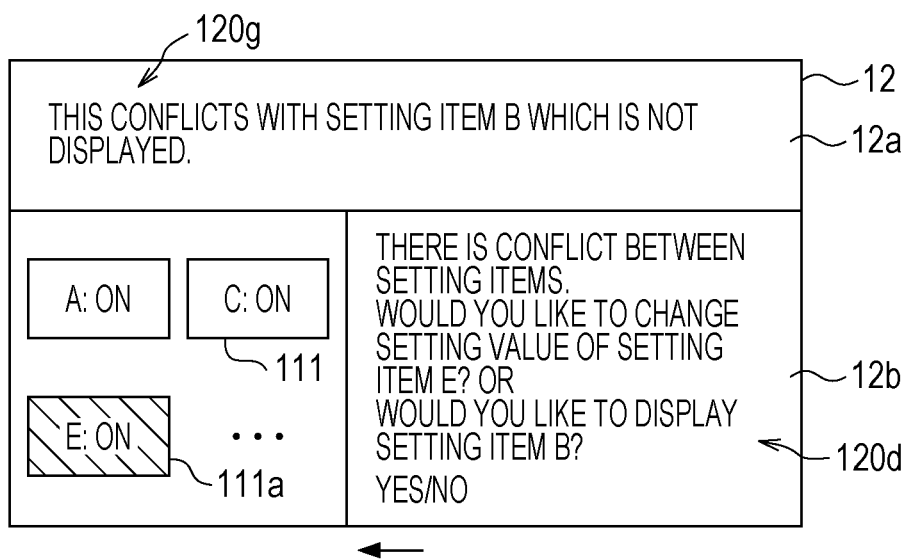

FIGS. 16A and 16B are each a screen view illustrating Modification 2 of the second exemplary embodiment. As illustrated in FIG. 16A which shows the same screen as FIG. 14A, when the toggle switch 111a of the setting item E is selected, as illustrated in FIG. 16B, the screen name display section 14 is replaced by a message display section 12a. In addition, the area of the item display section 11 is reduced, and a second message display section 12b is displayed. In the second message display section 12b, for instance, the message 120d saying "THIS CONFLICTS WITH THE SETTING ITEM B. WOULD YOU LIKE TO CHANGE THE SETTING VALUE OF SETTING ITEM E? OR WOULD YOU LIKE TO DISPLAY THE SETTING ITEM B? YES/NO" is displayed. When "YES" is selected, the screen for changing the setting value of the setting item B may be replaced by the second message display section 12b.

Figure 17A:
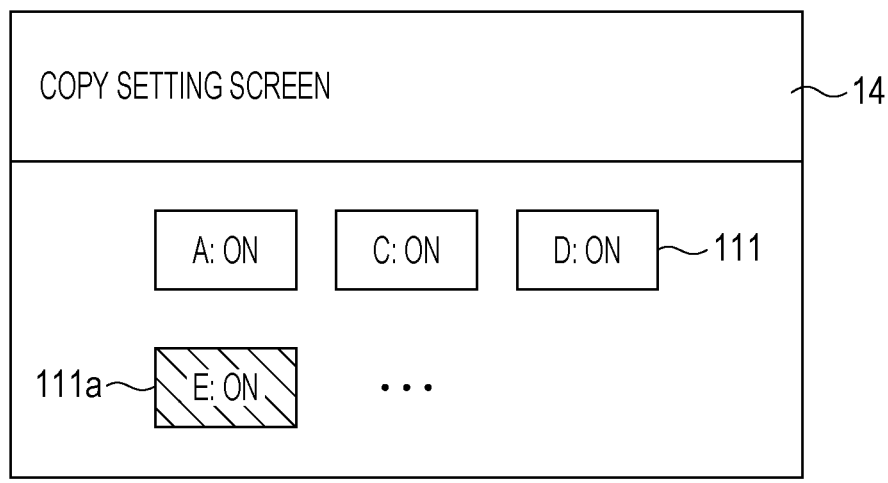
FIGS. 17A and 17B are each a screen view illustrating an example of a copy setting screen of Modification 3 according to the second exemplary embodiment.
Figure 17B:
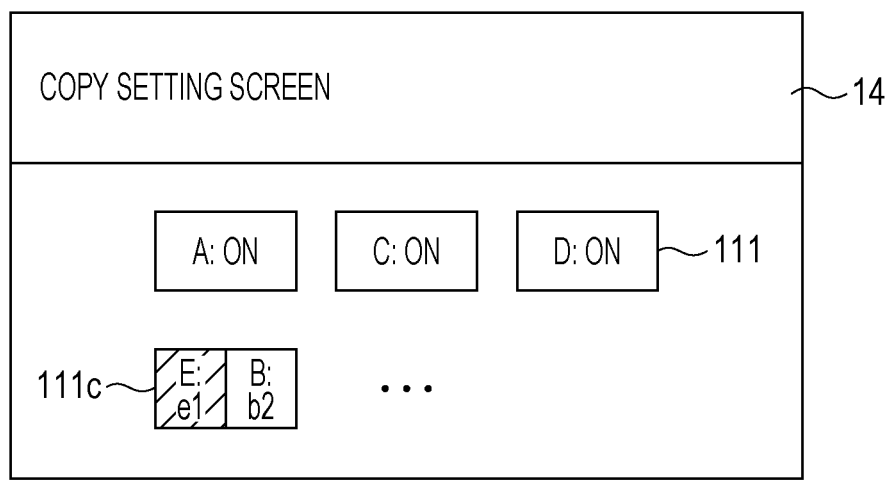

FIGS. 17A and 17B are each a screen view illustrating an example of a copy setting screen of Modification 3 according to the second exemplary embodiment. FIG. 17A is the same screen as FIG. 14A. When the toggle switch 111a of the setting item E is operated, as illustrated in FIG. 17B, a toggle switch 111c is formed by combining the toggle switch 111a of the setting item E and the toggle switch of the setting item B. When the setting value b2 of the setting item B is changed to b1 by the toggle switch 111c, the setting value e1 of the setting item E can be changed to e2.

Third Exemplary Embodiment

Figure 18:
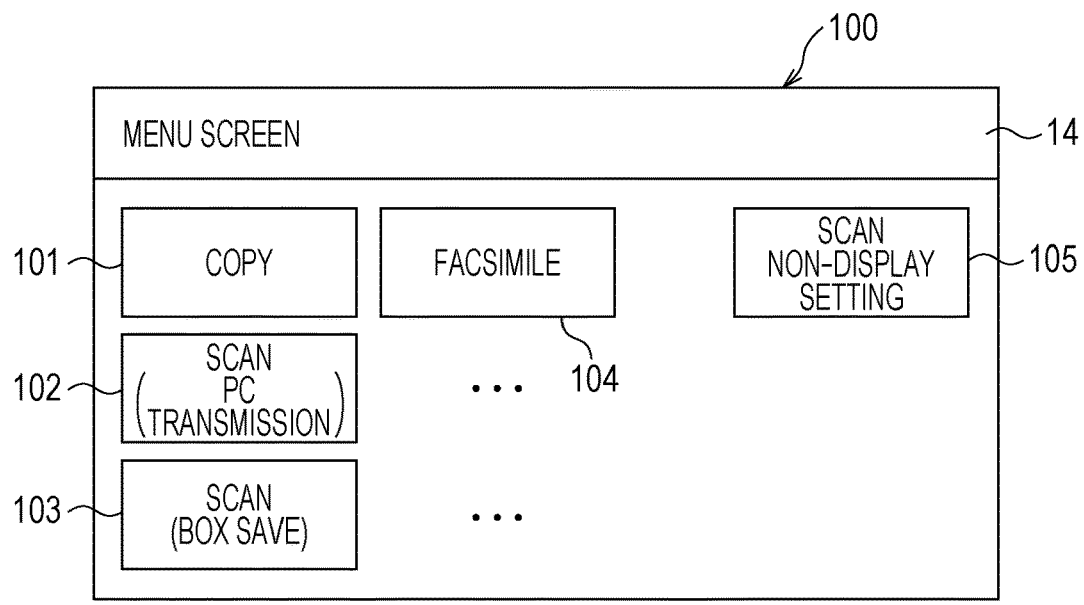
FIG. 18 is a screen view illustrating an example of a menu screen according to a third exemplary embodiment of the invention.

FIG. 18 is a screen view illustrating an example of a menu screen according to a third exemplary embodiment of the invention. In the menu screen 100 illustrated in FIG. 18, in addition to "copy" button 101, "scan (PC transmission)" button 102, "scan (box save)" button 103, and "facsimile" button 104 for selecting a function, "scan non-display setting" button 105 is displayed. When the "scan non-display setting" button 105 is operated, as illustrated in FIG. 19, a scan non-display setting screen 130 is displayed on the operation display 4.

FIG. 19 is a screen view illustrating an example of the scan non-display setting screen 130. The scan non-display setting screen 130 is for setting each setting item for scan to non-display. For instance, as illustrated in FIG. 19, scan, which is one of the functions of the image forming apparatus, is provided with setting items 131 such as printed paper scan, reading magnification, color mode, ground color removal, read concentration, and show-through prevention. The printed paper scan 131a is enabled in color mode, but is disabled in monochrome mode. In other words, the printed paper scan and the monochrome mode are in a relationship of conflict. It is assumed that regular paper scan out of regular paper scan/printed paper scan is set as an initial value, and monochrome mode out of monochrome mode/color mode is set as an initial value.

Figure 20:
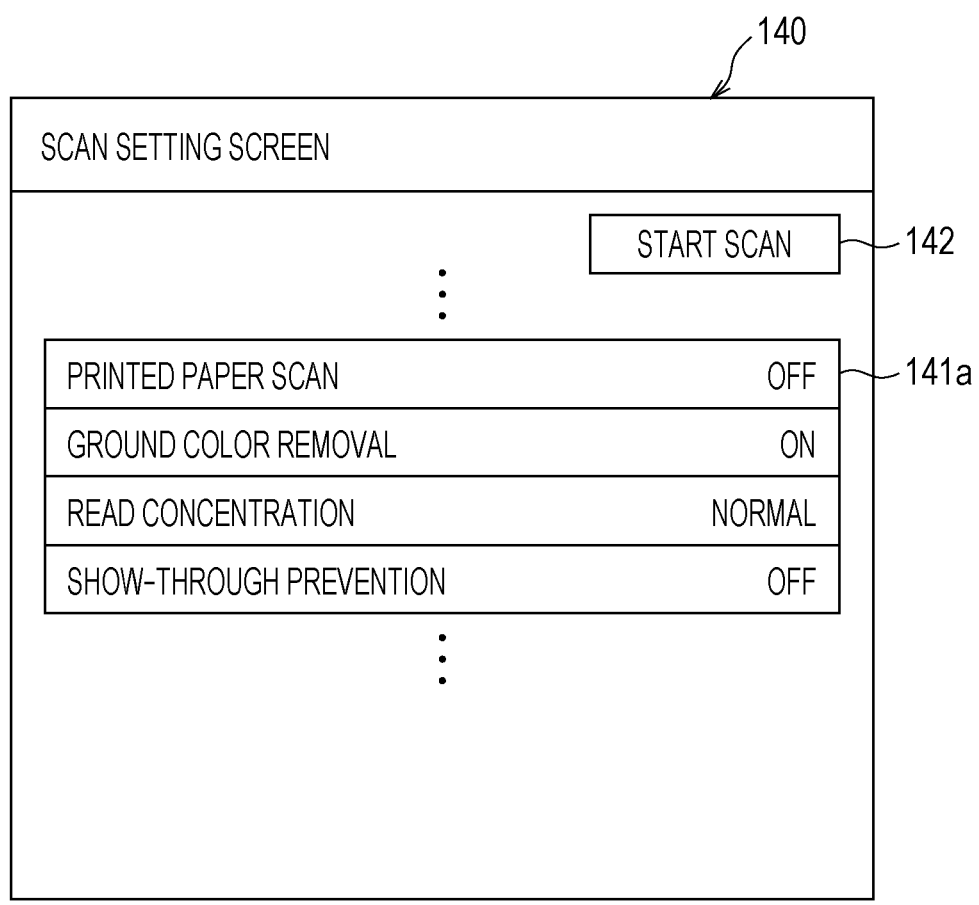
FIG. 20 is a screen view illustrating an example of a scan setting screen according to the third exemplary embodiment.

As illustrated in FIG. 19, the setting item of "reading magnification" is set to "not displayed" (non-display), the setting item of "color mode" is set to "not displayed" (non-display), and when "save" button 132 is operated, the content of setting is saved. In the menu screen 100 illustrated in FIG. 18, when the "scan (PC transmission)" button 102, or the "scan (box save)" button 103 is selected, as illustrated in FIG. 20, a scan setting screen 140, which reflects the setting of non-display, is displayed on the operation display 4. It is to be noted that an operation for change is canceled by "cancel" button 133 illustrated in FIG. 19.

FIG. 20 is a screen view illustrating an example of a scan setting screen corresponding to the scan non-display setting screen 130 of FIG. 19. In the scan setting screen 140, the setting item of "reading magnification" and the setting item of "color mode" are set to non-display. When "start scan" button 142 is operated, scan (PC transmission) or scan (box save) starts.

Figure 21:
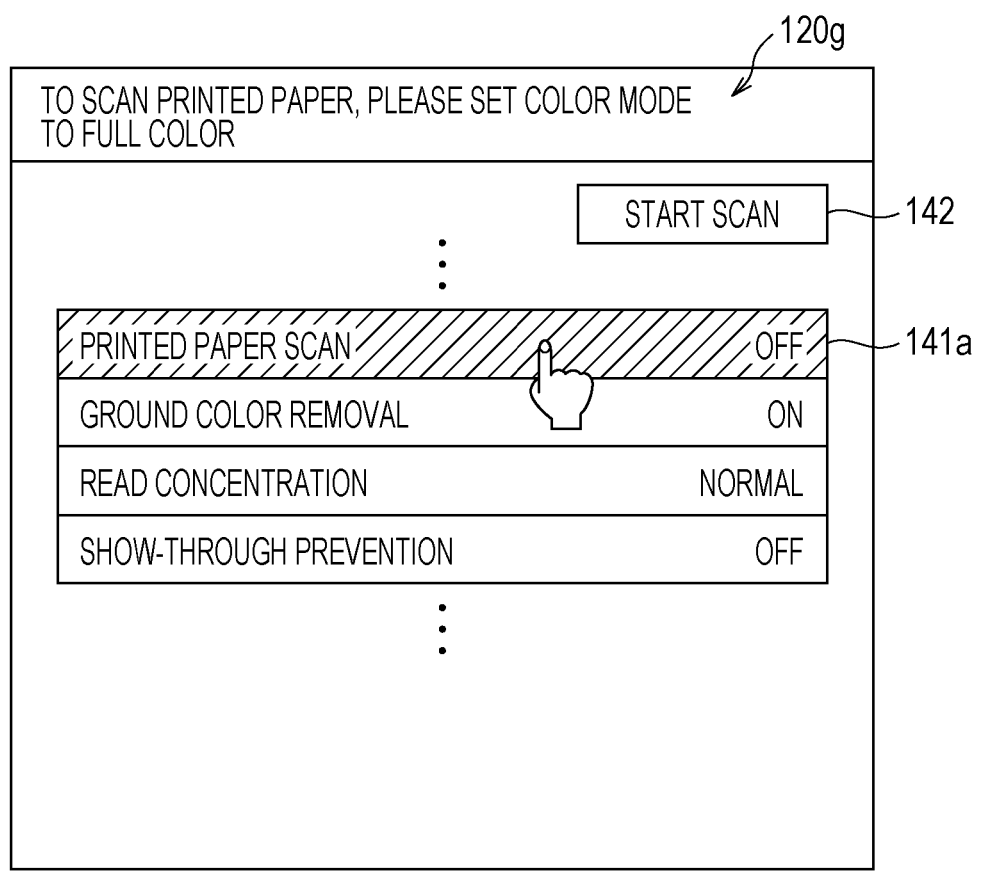
FIG. 21 is a screen view illustrating an example of a scan setting screen according to the third exemplary embodiment.

When setting item 141a of "printed paper scan", in which "OFF" (regular paper scan) is set as an initial value, is selected in the scan setting screen 140 illustrated in FIG. 20, the setting item 141a of "printed paper scan" conflicts with the setting value of monochrome mode as the initial value of monochrome mode/color mode, and thus is grayout-displayed as illustrated in FIG. 21. A message 120g saying "TO SCAN PRINTED PAPER, PLEASE SET THE COLOR MODE TO FULL COLOR" is displayed.

Figure 22:
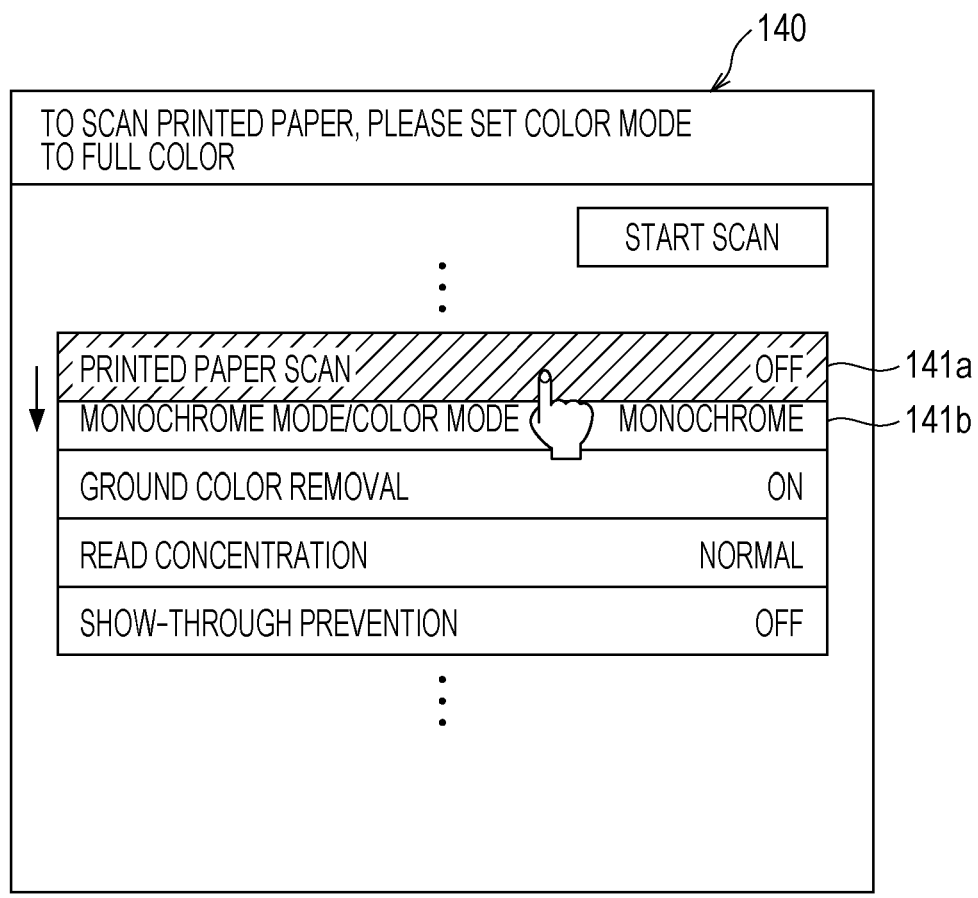
FIG. 22 is a screen view illustrating an example of a scan setting screen according to the third exemplary embodiment.

Next, as illustrated in FIG. 22, the setting item 141b of monochrome mode/color mode, in which "monochrome" is set as an initial value, appears next to the setting item 141a of "printed paper scan". When "monochrome" in the setting item 141b of "monochrome mode/color mode" is changed to "color", the grayout of the setting item 141a of "printed paper scan" is canceled, and the setting item 141a of "printed paper scan" can be changed to the setting value of "ON".

Other Exemplary Embodiments

Although the exemplary embodiments of the invention have been described above, the exemplary embodiments of the invention are not limited to the above-described exemplary embodiments, and various modifications and implementations may be made without departing from the gist of the invention. A case has been described where for instance, as other setting items related to a specific non-display setting item, the specific setting item and other setting items have setting values in a relationship of conflict in the exemplary embodiments. However, alternatively when the setting value of the specific setting item is operated with a frequency higher than or equal to a threshold value in relation to an operated setting value of other setting items, both setting items and setting values may be pre-registered in a table stored in the memory 3, and when a setting value of other setting items registered in the table is operated, the setting value of the specific non-display setting item may be changeably displayed.

Part or all of each unit of the controller 2 may be configured by a hardware circuit such as a field programmable gate array (FPGA), or an application specific integrated circuit (ASIC).

Also, part of the components of the exemplary embodiments may be omitted or changed within a range not departing from the gist of the invention. Also, a step may be added, deleted, changed, or replaced in the flow of the exemplary embodiments within a range not departing from the gist of the invention. Alternatively, the program used in the exemplary embodiments may be recorded in a computer readable medium such as a CD-ROM and provided. Alternatively, the program used in the exemplary embodiments is stored in an external server, such as a cloud server, and can be utilized via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a controller that, when an operation is performed on one or more other setting items related to a specific setting item set to non-display, performs control to changeably display a setting value of the specific setting item, wherein
a function controlled by the specific setting item corresponds to a function controlled by the one or more other setting items.

2. The information processing apparatus according to claim 1,
wherein the controller performs control to display the specific setting item in a different manner from a manner in which the one or more other setting items are displayed.

3. The information processing apparatus according to claim 2,
wherein the controller performs control to display the specific setting item in the different manner in a second section different from a first section in which the one or more other setting items are displayed, and to display at least part of the first section and the second section at a same time.

4. The information processing apparatus according to claim 3,
wherein the controller performs control to display the specific setting item in the second section which is arranged to overlap with the first section.

5. The information processing apparatus according to claim 3,
wherein the controller performs control to ensure the second section in which the specific setting item is displayed by deforming or moving the first section in which the one or more other setting items are displayed, and to display the specific setting item in the second section.

6. The information processing apparatus according to claim 1,
wherein the specific setting item is a setting item to be displayed by default but is set to non-display by editing.

7. The information processing apparatus according to claim 2,
wherein the specific setting item is a setting item to be displayed by default but is set to non-display by editing.

8. The information processing apparatus according to claim 3,
wherein the specific setting item is a setting item to be displayed by default but is set to non-display by editing.

9. The information processing apparatus according to claim 4,
wherein the specific setting item is a setting item to be displayed by default but is set to non-display by editing.

10. The information processing apparatus according to claim 5,
wherein the specific setting item is a setting item to be displayed by default but is set to non-display by editing.

11. The information processing apparatus according to claim 1,
wherein the controller performs control to insert and display the specific setting item in a position adjacent to the one or more other setting items by changing a screen structure in which the one or more other setting items are displayed.

12. The information processing apparatus according to claim 1,
wherein the controller performs control to changeably display the setting value of the specific setting item by moving a display section of a screen.

13. The information processing apparatus according to claim 5,
wherein after the setting value of the specific setting item, in which the setting value is changeably displayed, is changed, the controller restores the screen structure before the specific setting item is displayed.

14. The information processing apparatus according to claim 1,
wherein after the setting value of the specific setting item, in which the setting value is changeably displayed, is changed, the controller sets the specific setting item to non-display.

15. The information processing apparatus according to claim 1,
wherein the one or more other setting items related to the specific setting item are registered as setting items in which the setting value of the specific setting item is operated with a high frequency in relation to an operated setting value of the one or more other setting items.

16. The information processing apparatus according to claim 1,
wherein the one or more other setting items related to the specific setting item have setting values that conflict with each other.

17. A non-transitory computer readable medium storing a program causing a computer to execute a process, the process comprising:
when an operation is performed on one or more other setting items related to a specific setting item set to non-display, performing control to changeably display a setting value of the specific setting item, wherein
a function controlled by the specific setting item corresponds to a function controlled by the one or more other setting items.

* * * * *